(12) United States Patent
Lee et al.

(10) Patent No.: US 11,733,538 B2
(45) Date of Patent: Aug. 22, 2023

(54) CAMERA MODULE

(71) Applicant: Samsung Electro-Mechanics Co., Ltd., Suwon-si (KR)

(72) Inventors: Sang Jong Lee, Suwon-si (KR); Su Bong Jang, Suwon-si (KR); Young Bok Yoon, Suwon-si (KR); Seung Hee Hong, Suwon-si (KR); Nam Ki Park, Suwon-si (KR); Hee Soo Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/096,079

(22) Filed: Nov. 12, 2020

(65) Prior Publication Data
US 2021/0173226 A1 Jun. 10, 2021

(30) Foreign Application Priority Data

Dec. 10, 2019 (KR) .......................... 10-2019-0164184
Jan. 3, 2020 (KR) .......................... 10-2020-0001061

(51) Int. Cl.
*G02B 27/64* (2006.01)
*G02B 7/04* (2021.01)
*H02K 41/035* (2006.01)
*G03B 5/02* (2021.01)

(52) U.S. Cl.
CPC ............. *G02B 27/646* (2013.01); *G02B 7/04* (2013.01); *G03B 5/02* (2013.01); *H02K 41/0356* (2013.01); *G03B 2205/0069* (2013.01)

(58) Field of Classification Search
CPC ..... G03B 5/02; G02B 27/646; H02K 41/0356
See application file for complete search history.

(56) References Cited

U.S. PATENT DOCUMENTS 8,041,201 B2 * 10/2011 Eromaki .............. G02B 27/646
396/55
8,625,022 B2 1/2014 Nakayama
2005/0276172 A1 12/2005 Tsutsumi
(Continued)

FOREIGN PATENT DOCUMENTS

CN 1713014 A 12/2005
CN 102298220 A 12/2011
(Continued)

OTHER PUBLICATIONS

Korean Office Action dated Mar. 3, 2021 in counterpart Korean Patent Application No. 10-2020-0001061 (7 pages in English)(6 pages in Korean).
(Continued)

*Primary Examiner* — Minh Q Phan
(74) *Attorney, Agent, or Firm* — NSIP Law

(57) ABSTRACT

A camera module includes: a housing in which a lens module is accommodated; and a shake correction portion including first and second movable yokes mounted on the lens module and first and second coil portions disposed to oppose the first and second movable yokes, respectively. The first coil portion is configured to attract the first movable yoke in response to power being applied to the first coil portion. The second coil portion is configured to attract the second movable yoke in response to power being applied to the second coil portion.

16 Claims, 5 Drawing Sheets

(56) References Cited

U.S. PATENT DOCUMENTS

| | | |
|---|---|---|
| 2009/0252488 A1 | 10/2009 | Eromaki et al. |
| 2011/0317060 A1* | 12/2011 | Nakayama ............... G03B 5/00 348/357 |
| 2015/0103195 A1 | 4/2015 | Kwon et al. |
| 2015/0373272 A1 | 12/2015 | Lim et al. |
| 2017/0082823 A1 | 3/2017 | Hwang et al. |
| 2017/0160558 A1 | 6/2017 | Kim et al. |
| 2018/0239162 A1 | 8/2018 | Lee et al. |
| 2018/0278850 A1 | 9/2018 | Kim et al. |
| 2018/0299644 A1* | 10/2018 | Lee ........................ G03B 3/10 |
| 2019/0124265 A1 | 4/2019 | Lee et al. |
| 2019/0273847 A1 | 9/2019 | Lee et al. |

FOREIGN PATENT DOCUMENTS

| | | |
|---|---|---|
| CN | 104570547 A | 4/2015 |
| CN | 105278208 A | 1/2016 |
| CN | 106291861 A | 1/2017 |
| CN | 108027494 A | 5/2018 |
| CN | 110231690 A | 9/2019 |
| KR | 10-2016-0005956 A | 1/2016 |
| KR | 10-2018-0012839 A | 2/2018 |
| KR | 10-2018-0095420 A | 8/2018 |
| KR | 10-2018-0109180 A | 10/2018 |
| KR | 10-2019-0045579 A | 5/2019 |
| KR | 10-2019-0061439 A | 6/2019 |

OTHER PUBLICATIONS

Chinese Office Action dated Dec. 30, 2021 in corresponding Chinese Patent Application No. 202011426029.8. (7 pages in English and 8 pages in Chinese).

* cited by examiner

CAMERA MODULE

CROSS-REFERENCE TO RELATED APPLICATIONS

This application claims the benefit under 35 U.S.C. § 119(a) of Korean Patent Application No. 10-2019-0164184 filed on Dec. 10, 2019 and Korean Patent Application No. 10-2020-0001061 filed on Jan. 3, 2020, in the Korean Intellectual Property Office, the entire disclosures of which are incorporated herein by reference for all purposes.

BACKGROUND

1. Field

The following description relates to a camera module.

2. Description of Related Art

Recently, a camera module has been employed in mobile communication terminals such as smartphones, tablet PCs, and laptop computers, and such a camera module may include an autofocusing (AF) function and an optical image stabilization (OIS) function.

To implement an AF function and an OIS function, an actuator that may move a lens module in an optical axis direction and a direction perpendicular to the optical axis direction may be required. A VCM actuator using electromagnetic force generated by a magnet and a coil may be used as such an actuator.

In the case of an AF actuator, a yoke configured to prevent magnetic flux leakage may be installed on an external side of a coil, and attractive force may be generated between a magnet and the yoke. A ball member configured to guide movement of the lens module during AF may be disposed between the magnet and the coil, and the magnet may receive compressive force working towards the coil (and the yoke) by the attractive force between the magnet and the yoke. Accordingly, the magnet may move in an optical axis direction while being in close contact with the ball member, such that AF may be implemented.

However, as an OIS actuator may implement an OIS function by changing a spacing (e.g., a spacing in a direction perpendicular to an optical axis direction) between a magnet and a coil, it may be difficult to arrange a yoke on an external side of the coil.

Therefore, in contrast to an AF actuator, an OIS actuator may have a problem of leakage of magnetic flux, which may cause interference with electronic components disposed around a camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing in which a lens module is accommodated; and a shake correction portion including first and second movable yokes mounted on the lens module and first and second coil portions disposed to oppose the first and second movable yokes, respectively. The first coil portion is configured to attract the first movable yoke in response to power being applied to the first coil portion. The second coil portion is configured to attract the second movable yoke in response to power being applied to the second coil portion.

The first and second movable yokes may be formed of a material magnetized by magnetic fields of the first and second coil portions.

The first coil portion and the second coil portion may each include two coils disposed in a direction perpendicular to an optical axis.

The first movable yoke and the second movable yoke may be configured to move in a direction perpendicular to the optical axis, in response to power being individually applied to the first coil portion and the second coil portion.

The first coil portion may include a first coil and a second coil disposed along a first axis perpendicular to an optical axis. The second coil portion may include a third coil and a fourth coil disposed along a second axis perpendicular to the optical axis and the first axis.

A portion of each of the first coil and the second coil may be disposed to face the first movable yoke. A portion of each of the third coil and the fourth coil may be disposed to face the second movable yoke.

A first plurality of yokes may be disposed in positions corresponding to the first coil and the second coil on an external side of the first coil portion. A second plurality of yokes may be disposed in positions corresponding to the third coil and the fourth coil on an external side of the second coil portion.

The camera module may be configured to detect a position of the lens module through changes in inductance of the first and second coil portions according to movement of the first and second movable yokes.

An inductance value of the first coil and an inductance value of the second coil may increase or decrease in opposite directions according to the movement of the first movable yoke. An inductance value of the third coil and an inductance value of the fourth coil may increase or decrease in opposite directions according to the movement of the second movable yoke.

A length of the first movable yoke in a direction of the first axis may be shorter than a length of the first coil portion in the direction of the first axis. A length of the second movable yoke in a direction of the second axis may be shorter than a length of the second coil portion in the direction of the second axis.

In a state in which power is not applied to the first coil portion, a center of the first movable yoke may be disposed between the first coil and the second coil. In a state in which power is not applied to the second coil portion, a center of the second movable yoke may be disposed between the third coil and the fourth coil.

The camera module may further include a carrier accommodated in the housing. The carrier may include the lens module and a frame configured to guide movement of the lens module.

The camera module may further include: a first ball member disposed between the carrier and the frame; and a second ball member disposed between the frame and the lens module. The first ball member may be disposed to roll in a first axis direction so as to guide movement of the frame and the lens module in the first axis direction. The second ball member may be disposed to roll in a second axis direction so as to guide movement of the lens module in the second axis direction. The first axis direction may be perpendicular to an optical axis, and the second axis direction may be perpendicular to the optical axis and the first axis direction.

The camera module may further include: a pulling magnet disposed in one of the carrier and the lens module; and a pulling yoke disposed in the other one of the carrier and the lens module. Magnetic attractive force may act in an optical axis direction between the pulling magnet and the pulling yoke.

In another general aspect, a camera module includes: a carrier in which a lens module is accommodated; a housing in which the lens module and the carrier are accommodated; a focus adjustment portion including a magnet disposed in the carrier and a coil disposed to face the magnet; and a shake correction portion including first and second movable yokes mounted on the lens module and first and second coil portions disposed to face the first and second movable yokes, respectively. The first and second movable yokes are formed of a material magnetized by magnetic fields of the first and second coil portions. The first coil portion and the second coil portion each include two coils disposed in a direction perpendicular to an optical axis. The first movable yoke is configured to move in two directions along a first axis perpendicular to the optical axis in response to a magnetic field of the first coil portion. The second movable yoke is configured to move in two directions along a second axis perpendicular to both the optical axis and the first axis in response to a magnetic field of the second coil portion.

A portion of each of the two coils of the first coil portion may be disposed to face the first movable yoke. A portion of each of the two coils of the second coil portion may be disposed to face the second movable yoke.

A first plurality of yokes may be disposed in positions corresponding to the two coils of the first coil portion on an external side of the first coil portion. A second plurality of yokes may be disposed in positions corresponding to the two coils of the second coil portion on an external side of the second coil portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
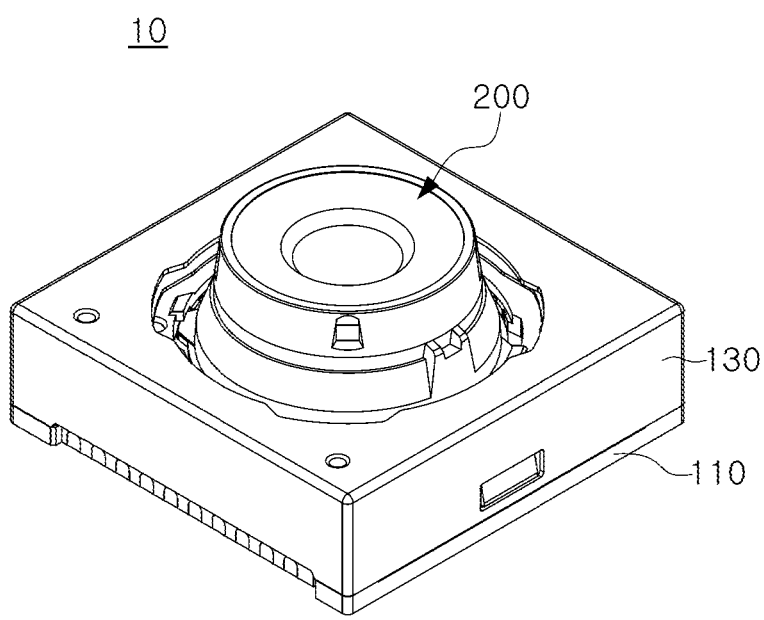
FIG. 1 is a perspective view illustrating a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

Figure 2:
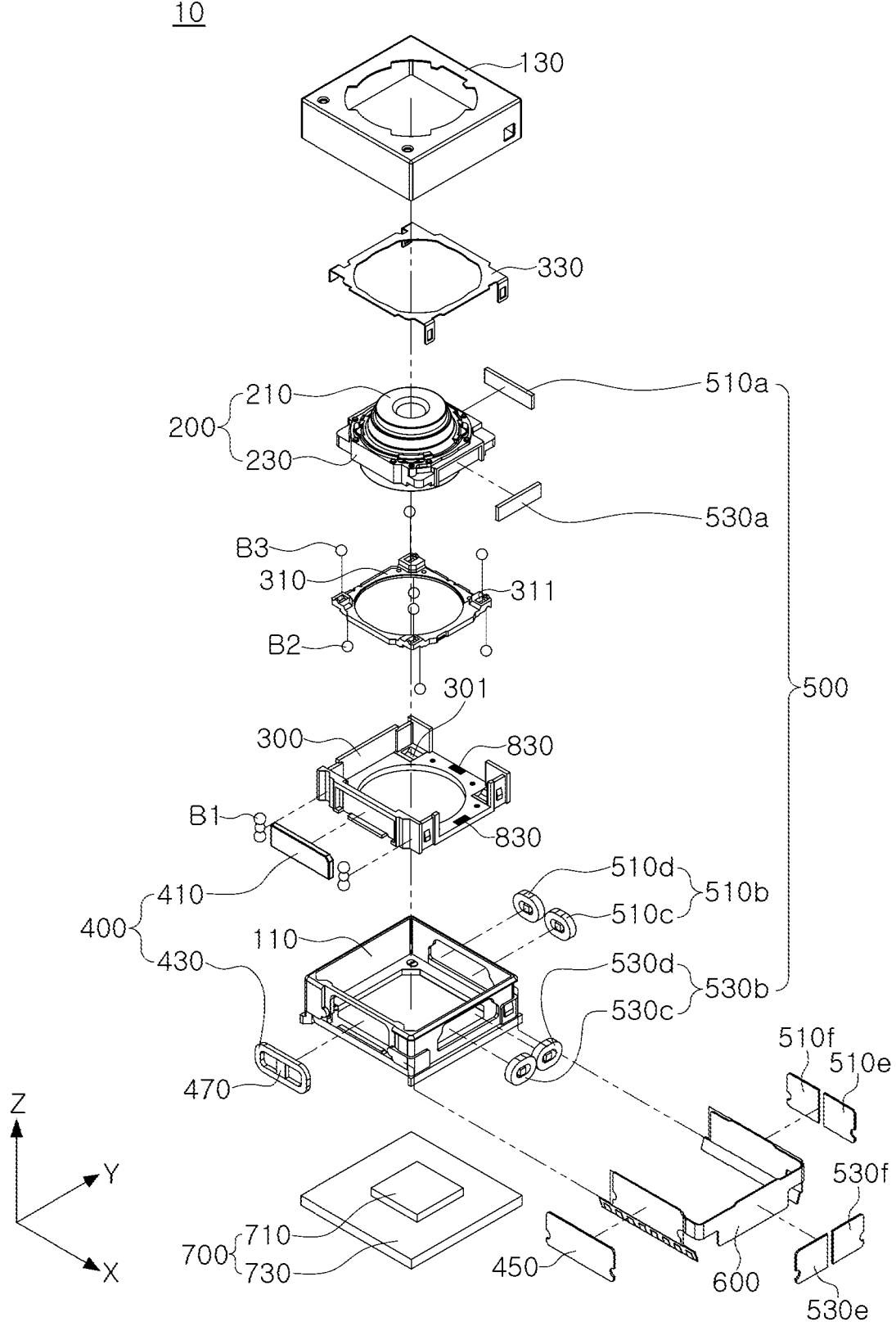
FIG. 2 is an exploded perspective view illustrating the camera module of FIG. 1, according to an embodiment.
Figure 3:
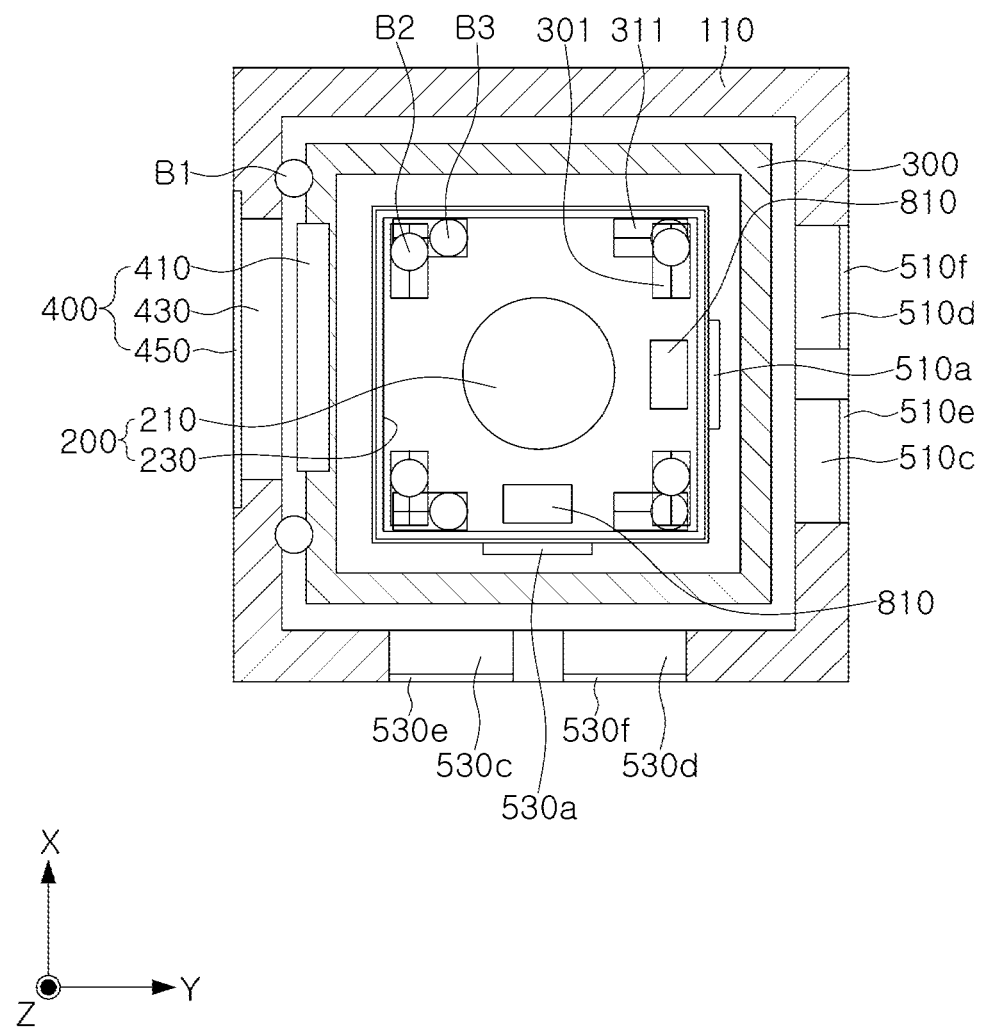
FIG. 3 is a plan view illustrating the camera module of FIG. 1, according to an embodiment.

FIG. 1 is a perspective view illustrating a camera module 10, according to an example embodiment. FIG. 2 is an exploded perspective view illustrating the camera 10. FIG. 3 is a plan view illustrating the camera module 10.

Referring to FIGS. 1 to 3, the camera module 10 may include, for example, a lens module 200, a lens driving device for moving the lens module 200, and an image sensor module 700 for converting light incident through the lens module 200 into an electric signal, and a housing 110 having the lens module 200 and the lens driving device accommodated therein.

The lens module 200 may include a lens barrel 210 and a lens holder 230. At least one lens for imaging an object may be accommodated in the lens barrel 210. When a plurality of lenses are disposed in the lens barrel 210, the plurality of lenses may be disposed in the lens barrel 210 along the optical axis. The lens barrel 210 may have a hollow cylindrical shape, and may be coupled to the lens holder 230.

As an example, the lens driving device may adjust a focus by moving the lens module 200 in the optical axis direction (Z axis direction), and may correct shaking while imaging an object by moving the lens module 200 in a direction (X axis direction and/or Y axis direction) perpendicular to the optical axis (Z axis).

The lens driving device may include a focus adjustment portion 400 configured to adjust a focus and a shake correction portion 500 configured to correct shaking.

The image sensor module 700 may be a device configured to convert light incident through the lens module 200 into an electric signal.

For example, the image sensor module 700 may include an image sensor 710 and a printed circuit board 730 connected to the image sensor 710, and may further include an infrared filter configured to block light in an infrared range from the light incident through the lens module 200.

The image sensor 710 may convert light incident through the lens module 200 into an electric signal. For example, the image sensor may be implemented by a charge coupled device (CCD) or complementary metal-oxide semiconductor (CMOS). The electrical signal converted by the image sensor 710 may be output as an image through a display unit of a portable electronic device.

The image sensor 710 may be fixed to the printed circuit board 730 and may be electrically connected to the printed circuit board 730 by wire bonding.

The lens module 200 may be accommodated in the housing 110. For example, the housing 110 has an open upper portion and an open lower portion, and the lens module 200 may be accommodated in an internal space of the housing 110.

The image sensor module 700 may be disposed below the housing 110.

The case 130 may be coupled to the housing 110 so as to surround an external surface of the housing 110, and may have a function to protect the internal components of the camera module 10.

The focus adjustment portion 400 of the lens driving device will be described with reference to FIG. 2.

Referring to FIG. 2, the lens driving device may move the lens module 200 to focus on a subject.

For example, the camera module 10 may include the focus adjustment portion 400 for moving the lens module 200 in the optical axis direction (Z axis direction).

The focus adjustment portion 400 may include a carrier 300 having the lens module 200 accommodated therein, and a magnet 410 and a coil 430 that may generate driving force to move the lens module 200 and the carrier 300 in the optical axis direction (Z axis direction). The magnet 410 and the coil 430 may be disposed to face each other in a direction perpendicular to the optical axis direction (Z axis direction).

The magnet 410 may be mounted on the carrier 300. For example, the magnet 410 may be mounted on one side surface of the carrier 300.

The coil 430 may be disposed on the substrate 600. For example, the coil 430 may be provided on an internal surface of the substrate 600. The substrate 600 may be mounted on the housing 110 such that the magnet 410 and the coil 430 face each other in a direction perpendicular to the optical axis (Z axis). The substrate 600 may have a "⌐"-shaped planar shape, and may be mounted on three side surfaces of the housing 110.

The housing 110 may have four side surfaces, and three of the four side surfaces may each have an opening. The substrate 600 may be mounted on three side surfaces of the housing 110 that include the openings.

The magnet 410 may be configured as a moving member mounted on the carrier 300 and configured to move in the optical axis direction (Z axis direction) along with the carrier 300. The coil 430 may be a fixed member fixed to the housing 110.

When power is applied to the coil 430, the carrier 300 may move in the optical axis direction (Z axis direction) by electromagnetic force between the magnet 410 and the coil 430. For example, when power is applied to the coil 430, driving force may be generated in the direction of the optical axis (Z axis) by the magnet 410 and the coil 430.

Since the lens module 200 is accommodated in the carrier 300, the lens module 200 may also move in the optical axis direction (Z axis direction) by the movement of the carrier 300. Since the frame 310 and the lens module 200 are accommodated in order in the carrier 300, the frame 310 and the lens module 200 may also move in the direction of the optical axis (Z axis) by the movement of the carrier 300.

A rolling member B1 may be disposed between the carrier 300 and the housing 110 to reduce friction between the carrier 300 and the housing 110 when the carrier 300 moves. The rolling member B1 may have a ball shape.

Rolling members B1 may be disposed on both sides of the magnet 410.

The yoke 450 may be disposed to face the magnet 410 in a direction perpendicular to the optical axis (Z axis). The yoke 450 may be mounted on the external surface of the substrate 600. For example, the yoke 450 may be disposed to face the magnet 410 with the coil 430 being disposed between the yoke 450 and the magnet 410.

The attractive force between the yoke 450 and the magnet 410 may work in a direction perpendicular to the optical axis (Z axis).

Accordingly, the rolling member B1 may maintain a state of contact with the carrier 300 and the housing 110 by the attractive force between the yoke 450 and the magnet 410.

The yoke 450 may also have a function to focus the magnetic force of the magnet 410. Accordingly, leakage of magnetic flux may be prevented. For example, the yoke 450 and the magnet 410 may form a magnetic circuit.

A closed-loop control method may be implemented for sensing a position of the lens module 200 and providing feedback of the position. Accordingly, a position sensor 470 may be provided for the closed-loop control. The position sensor 470 may be disposed in a hollow portion formed in a center of the coil 430 to face the magnet 410. The position sensor 470 may be configured as a hall sensor.

In the description below, the shake correction portion 500 of the lens driving apparatus will be described.

The shake correction portion 500 may be used to correct blurring of an image or shaking of a video caused by factors such as hand-shake of a user while an image or a video is obtained. For example, when shaking occurs by the hand-shake of a user while an image is obtained, the shake correction portion 500 may provide relative displacement corresponding to shaking to the lens module 200, thereby compensating for shaking. For example, the shake correction portion 500 may correct shaking by moving the lens module 200 in a direction perpendicular to the optical axis (Z axis).

The shake correction portion 500 may include a frame 310 configured to guide the movement of the lens module 200, a first movable yoke 510a and a first coil portion 510b, and a second movable yoke 530a and a second coil portion 530b that may generate driving force in a direction perpendicular to the optical axis (Z axis).

The first and second movable yokes 510a and 530a may be mounted on the lens module 200. For example, the first movable yoke 510a may be mounted on one side surface of the lens holder 230, and the second movable yoke 530a may be mounted on the other side surface of the lens holder 230.

The first movable yoke 510a and the second movable yoke 530a may be disposed perpendicular to each other.

The first and second movable yokes 510a and 530a may be formed of a metal. Also, the first and second movable yokes 510a and 530a may be formed of a material magnetized by magnetic fields of the first and second coil portions 510b and 530b. For example, the first and second movable yokes 510a and 530a may be formed of a magnetic material including any one or any combination of any two or more of iron, nickel, and cobalt. The first and second movable yokes 510a and 530a may be a magnetic material, rather than a magnet (permanent magnet).

Each of the first and second coil portions 510b and 530b may include two coils. As an example, the first coil portion 510b may include a first coil 510c and a second coil 510d disposed in-line along a first axis direction (X axis direction) perpendicular to the optical axis (Z axis), and the second coil portion 530b may include a third coil 530c and a fourth coil 530d disposed in-line along a second axis direction (Y axis direction) perpendicular to both the optical axis (Z axis) and the first axis (X axis).

The first and second coil portions 510b and 530b may be provided on the internal surface of the substrate 600. The substrate 600 may have a "⊏"-shaped planar shape, and the coil 430, the first coil portion 510b, and the second coil portion 530b may be disposed on three internal surfaces.

The first movable yoke 510a may be disposed to face the first coil portion 510b in the second axis direction (Y axis direction) perpendicular to the optical axis (Z axis), and the second movable yoke 530a may be disposed to face the coil portion 530b in the first axis direction (X axis direction) perpendicular to the optical axis (Z axis).

In the focus adjustment portion 400, driving force may be generated by interaction between the magnet 410 and the coil 430, and the shake correction portion 500 may generate driving force by an attractive force formed by magnetic fields of the first and second coil portions 510b and 530b.

A method of generating the driving force of the shake correction portion 500 will be described later with reference to FIG. 4.

The frame 310 and the lens holder 230 may be disposed in order in the carrier 300 in the optical axis direction (Z axis direction), and may be configured to guide the movement of the lens barrel 210. The frame 310 and the lens holder 230 may have a space in which the lens barrel 210 may be inserted. The lens barrel 210 may be inserted into and fixed to the lens holder 230.

The frame 310 and the lens holder 230 may move in a direction perpendicular to the optical axis (Z axis) by the attractive force formed by the magnetic fields of the first and second coil portions 510b and 530b with respect to the carrier 300.

The first movable yoke 510a may be drawn toward the first coil portion 510b by the attractive force formed by the magnetic field of the first coil portion 510b, and the second movable yoke 530a may be drawn toward the second coil portion 530b by the attractive force formed by the magnetic field of the second coil portion 530b.

For example, the first movable yoke 510a may move in the first axis direction (X axis direction) perpendicular to the optical axis (Z axis) by the attraction force formed by the magnetic field of the first coil portion 510b, and the second movable yoke 530a may move in the second axis direction (Y-axis direction) perpendicular to the first axis direction (X-axis direction) by the attraction force formed by the magnetic field of the second coil portion 530b.

Accordingly, the first movable yoke 510a may move in a direction perpendicular to the direction facing the first coil portion 510b, the second movable yoke 530a may move in a direction perpendicular to the direction facing the second coil portion 530b.

The second axis direction (Y axis direction) may be a direction perpendicular to both the optical axis (Z axis) direction and the first axis (X axis) direction.

The camera module 10 may include a plurality of ball members for supporting the frame 310 and the lens holder 230. The plurality of ball members may guide the movement of the frame 310, the lens holder 230, and the lens barrel 210 during the shake correction process, and may also maintain a gap among the carrier 300, the frame 310 and the lens holder 230. The plurality of ball members may include a first ball member B2 and a second ball member B3.

The first ball member B2 may guide the movement of the frame 310, the lens holder 230, and the lens barrel 210 in the first axis direction (X-axis direction), and the second ball member B3 may guides the movement of the lens holder 230 and the lens barrel 210 in the second direction (Y-axis direction).

As an example, the first ball member B2 may roll in the first direction (X-axis direction) when driving force in the first direction (X-axis direction) is generated. Accordingly, the first ball member B2 may guide the movement of the frame 310, the lens holder 230, and the lens barrel 210 in the first direction (X-axis direction).

The second ball member B3 may roll in the second direction (Y-axis direction) when driving force is generated in the second direction (Y-axis direction). Accordingly, the second ball member B3 may guide the movement of the lens holder 230 and the lens barrel 210 in the second direction (Y-axis direction).

A plurality of first ball members B2 may be disposed between the carrier 300 and the frame 310, and a plurality of second ball members B3 may be disposed between the frame 310 and the lens holder 230.

A first guide groove portion 301 configured to accommodate the first ball member B2 may be formed on at least one of the surfaces of the carrier 300 and the frame 310 facing each other in the optical axis direction (Z axis direction). The first guide groove portion 301 may include a plurality of first guide grooves corresponding to the plurality of first ball members B2.

The first ball members B2 may be respectively accommodated in the first guide grooves of the first guide groove portion 301 and fitted between the carrier 300 and the frame 310. In a state in which the first ball members B2 are accommodated in the first guide grooves of the first guide groove portion 301, movement of the first ball members B2 in the optical axis direction (Z axis direction) and the second axis direction (Y axis direction) may be prevented, and the first ball members B2 may only move in the first axis direction (X axis direction). For example, the first ball members B2 may only roll in the first axis direction (X axis direction). Accordingly, the planar shape of each of the first guide grooves of the first guide groove portion 301 may be a rectangular shape having a length (e.g., a longest side) in the first axis direction (X axis direction).

A second guide groove portion 311 for accommodating the second ball member B3 may be formed on at least one of the surfaces of the frame 310 and the lens holder 230 facing each other in the optical axis direction (Z axis direction). The second guide groove portion 311 may include a plurality of second guide grooves corresponding to the plurality of second ball members B3.

The second ball members B3 may be respectively accommodated in the second guide grooves of the second guide groove portion 311 and may be inserted between the frame 310 and the lens holder 230.

In a state in which the second ball members B3 are accommodated in the second guide grooves of the second guide groove portion 311, movement of the second ball members B3 in the optical axis direction (Z axis direction) and the first axis direction (X axis direction) may be prevented, and the second ball members B3 may only move in the second axis direction (Y axis direction). As an example, the second ball members B3 may only roll in the second axis direction (Y axis direction). Accordingly, the planar shape of each of the second guide grooves of the second guide groove portion 311 may be a rectangular shape having a length (e.g., a longest side) in the second axis direction (Y axis direction).

When driving force is generated in the first axis direction (X axis direction), the frame 310, the lens holder 230, and the lens barrel 210 may move together in the first axis direction (X axis direction). The first ball members B2 may roll along the first axis direction (X axis direction). In this case, the movement of the second ball members B3 may be prevented.

Also, when driving force is generated in the second axis direction (Y axis direction), the lens holder 230 and the lens barrel 210 may move in the second axis direction (Y axis direction). The second ball members B3 may roll along the second axis direction (Y axis direction). In this case, the movement of the first ball members B2 may be prevented.

Figure 4:
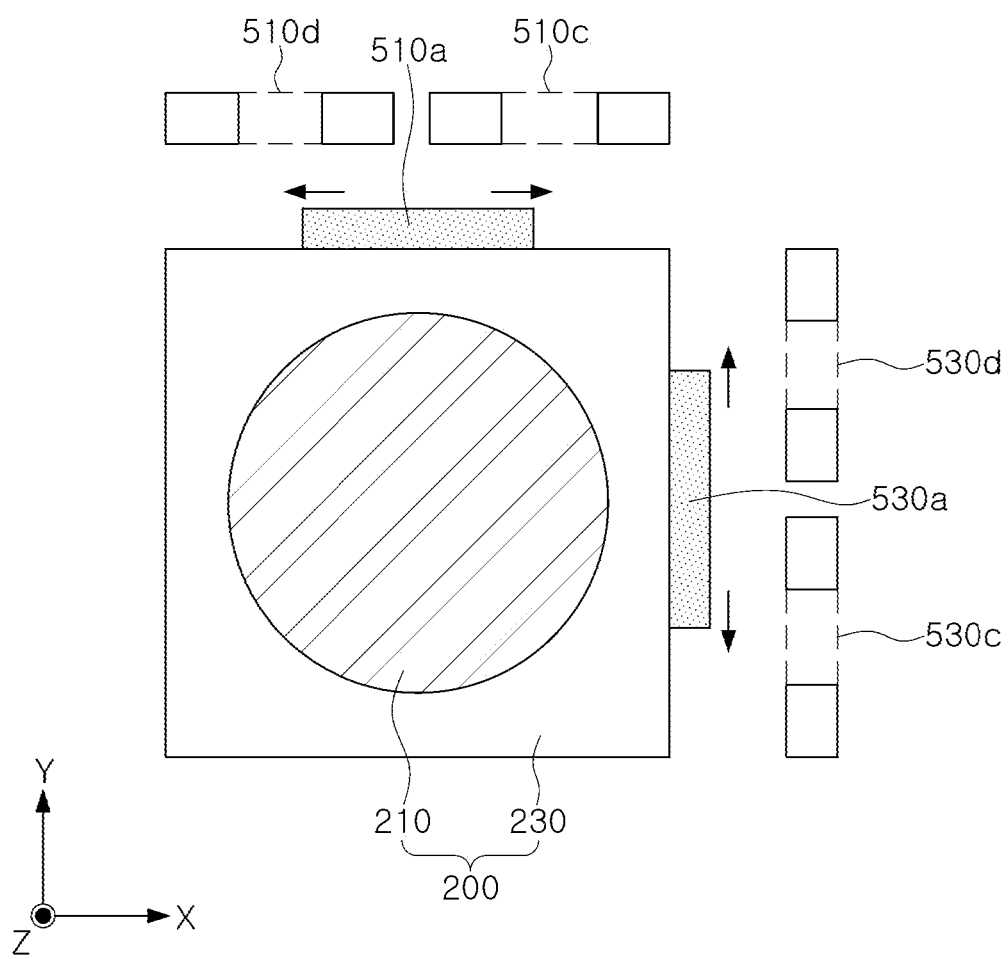
FIG. 4 is a view illustrating a dispositional relationship between first and second movable yokes and first and second coil portions of the camera module of FIG. 1, according to an embodiment.

FIG. 4 is a view illustrating a dispositional relationship between the first and second movable yokes 510a and 530a, and the first and second coil portions 510b and 530b.

Referring to FIG. 4, first and second movable yokes 510a and 530a may be mounted on the lens holder 230. The first movable yoke 510a and the second movable yoke 530a may be disposed perpendicular to each other. The first coil portion 510b may be disposed to face the first movable yoke 510a, and the second coil portion 530b may be disposed to face the second movable yoke 530a.

The first coil portion 510b may include the first coil 510c and a second coil 510d disposed in-line along the first axis direction (X axis direction). A length (in the first axis direction) of the first movable yoke 510a may be shorter than a length (in the first axis direction) of the first coil portion 510b. As an example, a portion of each of the first coil 510c and the second coil 510d may face the first movable yoke 510a. In a state in which power is not applied to the first coil portion 510b, a center of the first movable yoke 510a may be disposed between the first coil 510c and the second coil 510d, and a portion of each of the first coil 510c and the second coil 510d may be disposed to face the first movable yoke 510a.

The second coil portion 530b may include the third coil 530c and the fourth coil 530d disposed in-line along the second axis direction (Y axis direction). A length of the second movable yoke 530a (in the second axis direction) may be shorter than a length of the second coil portion 530b (in the second axis direction). For example, a portion of each of the third coil 530c and the fourth coil 530d may face the second movable yoke 530a. In a state in which power is not applied to the second coil portion 530b, a center of the second movable yoke 530a may be disposed between the third coil 530c and the fourth coil 530d, and a portion of each of the third coil 530c and the fourth coil 530d may be disposed to face the second movable yoke 530a.

Since the first movable yoke 510a is formed of a magnetic material, rather than a magnet (permanent magnet), when power is not applied to the first coil portion 510b, the first coil portion 510b may not attract the first movable yoke 510a. However, when power is applied to the first coil portion 510b, a magnetic field may be formed around the first coil portion 510b and, accordingly, the first coil portion 510b may pull the first movable yoke 510a.

A length (in the first axis direction) of the first movable yoke 510a may be shorter than a length (in the first axis direction) of the first coil portion 510b. Accordingly, when power is applied to the first coil 510c, the first movable yoke 510a may be drawn toward the first coil 510c by the magnetic field of the first coil 510c, and, when power is applied to the second coil 510d, the first movable yoke 510a may be drawn toward the second coil 510d by the magnetic field of the second coil 510d.

In other words, when power is applied to the first coil portion 510b, the first movable yoke 510a may move in the first axis direction (X axis direction) by the magnetic field of the first coil portion 510b. Since the first coil portion 510b includes the first coil 510c and the second coil 510d disposed in-line along the first axis direction (X axis direction), the first movable yoke 510a may move in both directions along the first axis (X axis).

Since the second movable yoke 530a is formed of a magnetic material, rather than a magnet (permanent magnet), when power is not applied to the second coil portion 530b, the second coil portion 530b may not attract the second movable yoke 530a. However, when power is applied to the second coil portion 530b, a magnetic field may be formed around the second coil portion 530b and, accordingly, the second coil portion 530b may pull the second movable yoke 530a.

A length (in second axis direction) of the second movable yoke 530a may be shorter than a length (in second axis direction) of the second coil portion 530b. Accordingly, when power is applied to the third coil 530c, the second movable yoke 530a may be drawn toward the third coil 530c by the magnetic field of the third coil 530c, and, when power is applied to the fourth coil 530d, the second movable yoke 530a may be drawn toward the fourth coil 530d by the magnetic field of the fourth coil 530d.

In other words, when power is applied to the second coil portion 530b, the second movable yoke 530a may move in the second axis direction (Y axis direction) by the magnetic field of the second coil portion 530b. Since the second coil portion 530b includes the third coil 530c and the fourth coil 530d disposed in-line along the second axis direction (Y axis direction), the second movable yoke 530a may move in both directions towards the second axis (Y axis).

A plurality of yokes 510e, 510f, 530e, and 530f may be disposed on external sides of the first and second coil portions 510b and 530b. For example, the plurality of yokes 510e, 510f, 530e, and 530f may be mounted on the external surface of the substrate 600. The plurality of yokes 510e and 510f may include a pair of yokes 510e and 510f corresponding to the first coil portion 510b and a pair of yokes 510e and 510f corresponding to the second coil portion 530b.

Each pair of yokes 510e and 510f may be disposed to face the first and second movable yokes 510a and 530a, respectively, in a direction perpendicular to the optical axis (Z axis). For example, each pair of yokes 510e and 510f, may be disposed to face the first and second movable yokes 510a and 530a, respectively, with the first and second coil portions 510b and 530b respectively interposed therebetween.

The plurality of yokes 510e and 510f may prevent leakage of magnetic flux of the first and second coil portions 510b and 530b.

In contrast to the focus adjustment portion 400, attractive force may not work between the first and second movable yoke 510a and 530a and the plurality of yokes 510e and 510f. Accordingly, the movement of the first and second movable yokes 510a and 530a may not be disturbed by the plurality of yokes 510e and 510f.

Also, since a magnet is not used for an actuator for shake correction, and the first and second movable yokes 510a and 530a may be used, and also as the plurality of yokes 510e and 510f are disposed on external sides of the first and second coil portions 510b and 530b, leakage of magnetic flux may be prevented.

Figure 5:
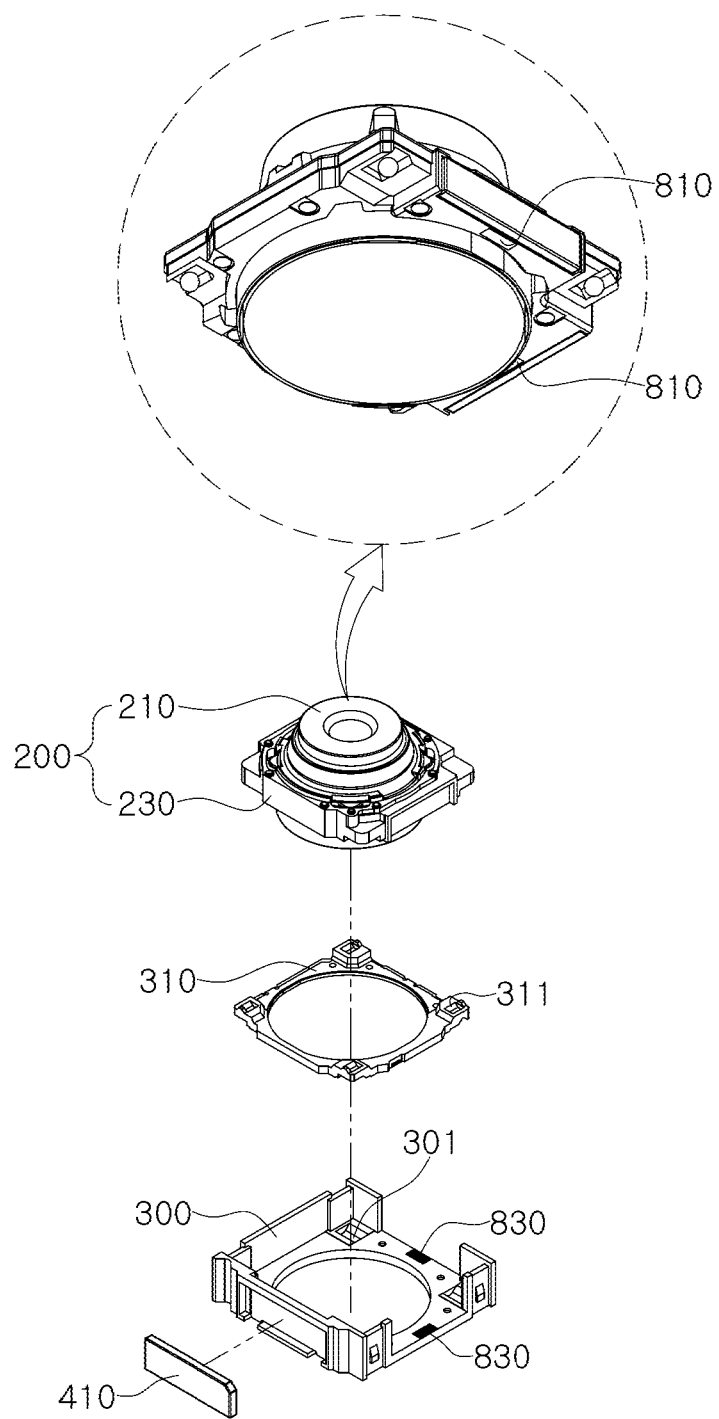
FIG. 5 is an exploded perspective view illustrating a lens module, a frame, and a carrier of the camera module of FIG. 1, according to an embodiment.

FIG. 5 is an exploded perspective view illustrating the lens module 200, the frame 310, and the carrier 300 of the camera module 10, according to an embodiment.

Referring to FIG. 5, in the camera module 10, a pulling yoke 830 and a pulling magnet 810 may be provided such that the shake correction portion 500 and first and second ball members B2 and B3 may maintain a state of contact therebetween. The pulling yoke 830 may be mounted on one of the carrier 300 and the lens module 200, and the pulling magnet 810 may be mounted on the other one of the carrier 300 and the lens module 200.

For example, the pulling yoke 830 may be fixed to the carrier 300, and the pulling magnet 810, which faces the pulling yoke 830 in the optical axis direction (Z axis direction), may be disposed on the lens module 200.

Accordingly, magnetic attractive force may be generated between the pulling yoke 830 and the pulling magnet 810 in the optical axis direction (Z axis direction).

The shaking correction portion 500 and the first and second ball members B2 and B3 may maintain a state of contact due to magnetic attractive force between the pulling yoke 830 and the pulling magnet 810 even when power is not applied to the first and second coil portions 510b and 530b, and the lens module 200 may be positioned at a predetermined initial position.

Since the lens holder 230 and the frame 310 are pressed in the direction toward the pulling yoke 830 by magnetic attractive force between the pulling yoke 830 and the pulling magnet 810, the frame 310 and the lens holder The 230 may maintain a state of contact with the first and second ball members B2 and B3.

In the example embodiment, a closed-loop control method for sensing the position of the lens barrel 210 in the shake correction process and providing a feedback of the position may be implemented.

Therefore, a position sensor may be provided for the closed-loop control, and the position sensor may be a hall sensor. The position sensor may be disposed on the carrier 300 to face the pulling magnet 810 in the optical axis direction (Z axis direction).

In contrast to the above-described configuration, a position sensor may not be provided and, in this case, positions of the first and second movable yokes 510a and 530a may be detected through changes in inductance of the first coil portion 510b and the second coil portion 530b.

For example, as the first and second movable yokes 510a and 530a move, the inductance of the first and second coil portions 510b and 530b may change. Accordingly, the positions of the first and second movable yokes 510a and 530a may be detected through changes in inductance of the first and second coil portions 510b and 530b.

Since the first and second movable yokes 510a and 530a are mounted on the lens module 200 and move together with the lens module 200, position of the lens module 200 may be detected through changes in inductance of the first and second coil portions 510b and 530b.

The first coil portion 510b may include the first coil 510c and the second coil 510d disposed along the first axis (X axis). When the first movable yoke 510a moves along the first axis (X axis), an inductance value of the first coil 510c and an inductance value of the second coil 510d may increase or decrease in opposite directions.

Accordingly, by differentiating the inductance value of the first coil 510c and the inductance value of the second coil 510d, the influence of disturbance due to temperature change of the surrounding environment may be removed, and the position of the lens module 200 may be accurately detected.

The second coil portion 530b may include the third coil 530c and the fourth coil 530d disposed along the second axis (Y axis). When the second movable yoke 530a moves along the second axis (Y axis), the inductance value of the third coil 530c and the inductance value of the fourth coil 530d may increase or decrease in opposite directions.

Accordingly, by differentiating the inductance value of the third coil 530c and the inductance value of the fourth coil 530d, the influence of disturbance due to temperature change of the surrounding environment may be removed, and a position of the lens module 200 may be accurately detected.

The camera module 10 may include a stopper 330 (FIG. 1) to prevent the first and second ball members B2 and B3, the frame 310, and the lens module 200 from being detached to the outside of the carrier 300. The stopper 330 may be coupled to the carrier 300 to cover at least a portion of the upper surface of the lens holder 230.

According to the embodiments disclosed herein, a camera module may prevent magnetic flux leakage.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a housing in which a lens module is accommodated; and
    a shake correction portion including first and second movable yokes mounted on the lens module and first and second coil portions disposed to oppose the first and second movable yokes, respectively,
    wherein the first coil portion is configured to attract the first movable yoke linearly using attractive force in response to whether power is applied to the first coil portion,
    wherein the second coil portion is configured to attract the second movable yoke in response to whether power is applied to the second coil portion,
    wherein the first coil portion includes a first coil and a second coil disposed along a first axis perpendicular to an optical axis, and the second coil portion includes a third coil and a fourth coil disposed along a second axis perpendicular to the optical axis and the first axis,
    wherein in a state in which power is not applied to the first coil portion, a center of the first movable yoke is disposed between the first coil and the second coil, and
    wherein in a state in which power is not applied to the second coil portion, a center of the second movable yoke is disposed between the third coil and the fourth coil.

2. The camera module of claim 1, wherein the first and second movable yokes are formed of a material magnetized by magnetic fields of the first and second coil portions.

3. The camera module of claim 1, wherein the first movable yoke and the second movable yoke are configured to move in a direction perpendicular to the optical axis, in response to power being individually applied to the first coil portion and the second coil portion.

4. The camera module of claim 1, wherein a portion of each of the first coil and the second coil is disposed to face the first movable yoke, and
    wherein a portion of each of the third coil and the fourth coil is disposed to face the second movable yoke.

5. The camera module of claim 1, wherein a first plurality of yokes are disposed in positions corresponding to the first coil and the second coil on an external side of the first coil portion, and
    wherein a second plurality of yokes are disposed in positions corresponding to the third coil and the fourth coil on an external side of the second coil portion.

6. The camera module of claim 1, wherein the camera module is configured to detect a position of the lens module through changes in inductance of the first and second coil portions according to movement of the first and second movable yokes.

7. The camera module of claim 6, wherein, an inductance value of the first coil and an inductance value of the second coil increase or decrease in opposite directions according to the movement of the first movable yoke, and
    wherein an inductance value of the third coil and an inductance value of the fourth coil increase or decrease in opposite directions according to the movement of the second movable yoke.

8. The camera module of claim 1, wherein a length of the first movable yoke in a direction of the first axis is shorter than a length of the first coil portion in the direction of the first axis, and
    wherein a length of the second movable yoke in a direction of the second axis is shorter than a length of the second coil portion in the direction of the second axis.

9. The camera module of claim 1, further comprising:
    a carrier accommodated in the housing,
    wherein the carrier includes the lens module and a frame configured to guide movement of the lens module.

10. The camera module of claim 9, further comprising:
    a first ball member disposed between the carrier and the frame; and
    a second ball member disposed between the frame and the lens module,
    wherein the first ball member is disposed to roll in a first axis direction so as to guide movement of the frame and the lens module in the first axis direction,
    wherein the second ball member is disposed to roll in a second axis direction so as to guide movement of the lens module in the second axis direction, and
    wherein the first axis direction is perpendicular to an optical axis, and the second axis direction is perpendicular to the optical axis and the first axis direction.

11. The camera module of claim 9, further comprising:
    a pulling magnet disposed in one of the carrier and the lens module; and
    a pulling yoke disposed in the other one of the carrier and the lens module,
    wherein magnetic attractive force acts in an optical axis direction between the pulling magnet and the pulling yoke.

12. The camera module of claim 1, wherein the shake correction portion is configured to provide relative displacement to the lens module, between the first or second coil portion and a magnetic material of the first or second movable yoke, in a direction perpendicular to an optical axis based on a result of power being applied to the first or second coil portion.

13. The camera module of claim 12, wherein the magnetic material comprises any one or any combination of any two or more of iron, nickel, and cobalt.

14. A camera module, comprising:
    a carrier in which a lens module is accommodated;
    a housing in which the lens module and the carrier are accommodated;

a focus adjustment portion including a magnet disposed in the carrier and a coil disposed to face the magnet; and a shake correction portion including first and second movable yokes mounted on the lens module and first and second coil portions disposed to face the first and second movable yokes, respectively, wherein the first and second movable yokes are formed of a material magnetized by magnetic fields of the first and second coil portions, wherein the first coil portion and the second coil portion each include two coils disposed in a direction perpendicular to an optical axis, wherein the first movable yoke is configured to move in two linear directions along a first axis perpendicular to the optical axis using attractive force in response to a magnetic field of the first coil portion, wherein the second movable yoke is configured to move in two linear directions along a second axis perpendicular to both the optical axis and the first axis in response to a magnetic field of the second coil portion, wherein, in a state in which power is not applied to the first coil portion, a center of the first movable yoke is disposed between the two coils of the first coil portion, and wherein, in a state in which power is not applied to the second coil portion, a center of the second movable yoke is disposed between the two coils of the second coil portion.

15. The camera module of claim 14, wherein a portion of each of the two coils of the first coil portion is disposed to face the first movable yoke, and wherein a portion of each of the two coils of the second coil portion is disposed to face the second movable yoke.

16. The camera module of claim 14, wherein a first plurality of yokes are disposed in positions corresponding to the two coils of the first coil portion on an external side of the first coil portion, and wherein a second plurality of yokes are disposed in positions corresponding to the two coils of the second coil portion on an external side of the second coil portion.

* * * * *